United States Patent
Runge

(10) Patent No.: US 11,585,095 B2
(45) Date of Patent: Feb. 21, 2023

(54) HOLLOW STRUCTURAL ELEMENT OF A WIND ENERGY PLANT

(71) Applicant: Jörn Runge, Marklohe (DE)

(72) Inventor: Jörn Runge, Marklohe (DE)

(73) Assignee: RWE Renewables GmbH, Essen (DE)

(*) Notice: Subject to any disclaimer, the term of this patent is extended or adjusted under 35 U.S.C. 154(b) by 0 days.

(21) Appl. No.: 17/532,628

(22) Filed: Nov. 22, 2021

(65) Prior Publication Data
US 2022/0081911 A1 Mar. 17, 2022

Related U.S. Application Data
(63) Continuation of application No. PCT/EP2020/063153, filed on May 12, 2020.

(30) Foreign Application Priority Data
May 31, 2019 (DE) .................... 10 2019 114 655.0

(51) Int. Cl.
E04F 10/00 (2006.01)
F03D 13/25 (2016.01)

(52) U.S. Cl.
CPC ............ *E04F 10/005* (2013.01); *F03D 13/25* (2016.05); *F05B 2240/95* (2013.01)

(58) Field of Classification Search
CPC ..... E04F 10/005; F03D 13/25; F05B 2240/95
See application file for complete search history.

(56) References Cited

U.S. PATENT DOCUMENTS

| 11,239,645 B2 * | 2/2022 | Soerensen | H02G 9/06 |
| 2017/0077687 A1 | 3/2017 | Soerensen | |
| 2021/0222679 A1 * | 7/2021 | Obermeyer | F03D 80/60 |

FOREIGN PATENT DOCUMENTS

| CN | 103 775 288 B | 2/2017 | |
| DE | 20 2005 004 917 U1 | 7/2005 | |
| DE | 10 2014 206000 A1 | 10/2015 | |
| DE | 102014206000 A1 * | 10/2015 | F03D 9/257 |
| EP | 3 258 559 A1 | 12/2017 | |
| EP | 3258559 A1 * | 12/2017 | F03D 13/20 |
| JP | 3155370 U | 11/2009 | |
| JP | 2012-102692 A | 5/2012 | |
| KR | 20120100494 A * | 9/2012 | F03D 9/25 |
| KR | 20120100494 A | 9/2012 | |
| KR | 10-2013-0130319 A | 12/2013 | |
| KR | 20130130319 A * | 12/2013 | H02B 1/565 |
| KR | 10-2017-0007072 A | 1/2017 | |
| KR | 101720800 B1 | 4/2017 | |
| WO | WO 2011/033267 A2 | 3/2011 | |
| WO | WO-2011033267 A2 * | 3/2011 | F16L 1/19 |
| WO | WO 2013/044977 A1 | 4/2013 | |
| WO | WO 2015/071680 A1 | 5/2015 | |
| WO | WO-2015071680 A1 * | 5/2015 | H02G 1/10 |
| WO | WO 2017/037109 A1 | 3/2017 | |
| WO | WO 2018/095643 A1 | 5/2018 | |

* cited by examiner

*Primary Examiner* — S. Joseph Morano
*Assistant Examiner* — Jovon E Hayes
(74) *Attorney, Agent, or Firm* — Reinhart Boerner Van Deuren P.C.

(57) ABSTRACT

A hollow structural element of a wind energy plant, in particular an offshore wind energy plant which includes a hollow structural element, and a cable arrangement extending along the hollow structural element. A shading element is arranged on the hollow structural element at a distance from the cable arrangement.

14 Claims, 8 Drawing Sheets

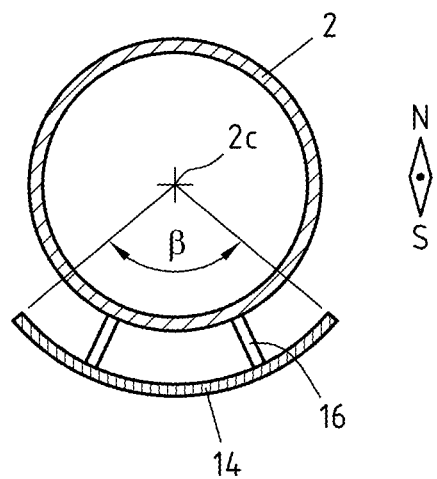
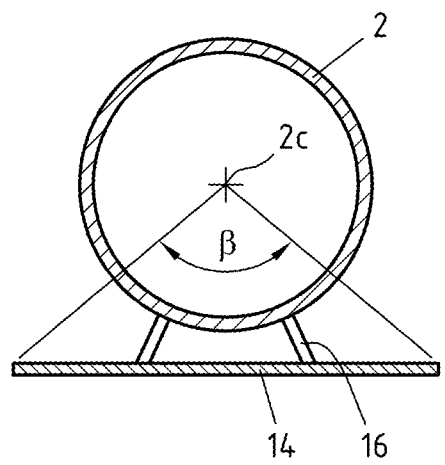
Fig.3a Fig.3b
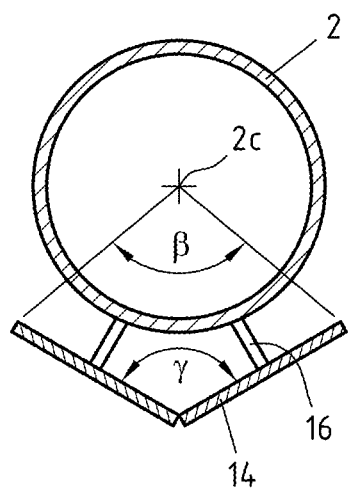
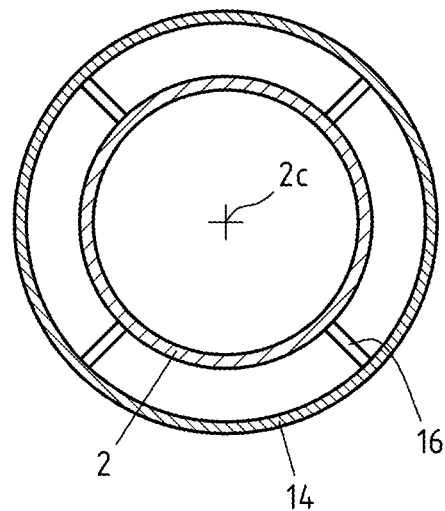
Fig.3c Fig.3d

HOLLOW STRUCTURAL ELEMENT OF A WIND ENERGY PLANT

CROSS-REFERENCE TO RELATED PATENT APPLICATIONS

This patent application is a continuation of International Application No. PCT/EP2020/063153, filed on May 12, 2020, which claims the benefit of priority to German Patent Application No. 10 2019 114 655.0, filed May 31, 2019, the entire teachings and disclosures of both applications are incorporated herein by reference thereto.

FIELD OF THE INVENTION

The subject matter relates to a hollow structural element of a wind energy plant and to a wind energy plant with such a hollow structural element.

BACKGROUND OF THE INVENTION

Wind energy plants are founded in the ground. This applies in particular to offshore wind energy plants, which are anchored in the seabed by means of a foundation structure. The foundation structure then serves as the basis for constructing the tower, including the nacelle and electrical installations.

Inside the foundation structure is arranged a platform, a so-called "airtight" deck.

The electrical power cables, which serve the connection of the wind energy plant to a power supply network, are laid along the foundation structure up to the platform. Typically, multiple electrical cable strands are grouped together to form a cable arrangement of a power cable. The electrical conductors in the cable strands may be individually insulated. The cable strands may additionally be routed in a common insulation. The conductor cross sections within the cable strands are designed for theoretically possible maximum loads. Such maximum loads arise in particular when, on the one hand, the ohmic losses within the cables are high and, on the other hand, the ambient temperature at the cable arrangement is high. The ohmic losses increase quadratically with the current along the cable and linearly with the ohmic resistance of the conductor. To minimize the ohmic losses, therefore, a correspondingly large conductor cross-section is always selected in the cable strands. In the following, the term cable is used synonymously for the conductor in a cable harness as well as the cable harness and/or the cable arrangement, if applicable.

High currents along the cables occur during high wind forces. In the event that the current in the conductors is high due to strong winds and at the same time the ambient temperature is high, for example in summer when the sun shines unhinderedly on the wind energy plant, considerable temperatures can occur within the cable arrangement. The conductor cross-sections as well as the insulation of the cable harnesses are often dimensioned in such a way that even under such conditions, i.e. maximum possible current with maximum possible solar radiation, the cables are not damaged. The issue is often the damaging of the electrical insulation layer of the cable, which loses its insulating effect above a maximum temperature. However, these extreme thermal loads on the cables only occur extremely rarely, but must be taken into account in their design. In this design, the conductor temperature can be reduced by lowering the ohmic resistance of the conductor.

To do this, one can either increase the conductor cross-section or switch to a conductor material with a lower specific ohmic resistance: e.g. from aluminum to copper. Both lead to considerable additional costs as well as to a considerably higher weight of the cable assemblies.

BRIEF SUMMARY OF THE INVENTION

The subject matter was based on the object of reducing the requirements for a cable arrangement of a wind energy plant.

This object is solved by a hollow structural element according to claim 1.

A hollow structural element according to the subject matter may be a foundation structure as mentioned above or a J-tube.

The cable arrangement may be guided along the foundation structure as described above. Thereby, the cable arrangement may be guided inside or outside the foundation structure. Also, the cable arrangement may be guided inside at least the J-Tube. A J-Tube may be arranged inside the foundation structure or outside at the foundation structure. In particular, when the J-Tube is arranged outside the foundation structure, the shading element may be arranged such that the J-Tube is guided between the foundation structure and the shading element.

Cables are typically routed within the hollow structural element in wind energy plants. Between the water surface and the exit of the cable from the hollow structural element, especially in the area of the airtight deck, the highest temperatures occur at the cable, since natural air circulation is almost eliminated. In this area, the hollow structural element should be shaded by the shading element.

It is proposed that a shading element is arranged on the hollow structural element at a distance from the cable arrangement. The shading element prevents the cable arrangement and/or the hollow structural element within which the cable arrangement is guided from being exposed to direct solar radiation, in particular when the sun is near its zenith. This reduces the maximum thermal load on the cable arrangement, since even in strong winds and clear weather, the cable arrangement is exposed to a lower ambient temperature compared to conventional systems. Thus, better or increased heat dissipation occurs at the cable arrangement by convection, since the ambient temperature is reduced compared to conventional installations.

The hollow structural element has a longitudinal axis. A section transverse to the longitudinal axis, in particular perpendicular to the longitudinal axis, can be understood as a cross section. When the shapes of the shading element are discussed in the following, this generally refers to a cross-section in the plane perpendicular to the longitudinal axis of the hollow structural element.

The hollow structural element may be one-piece or multi-piece. For the case of a foundation structure, the hollow structural element may be formed as a monopile and may be connected to a transition piece or may comprise the transition piece. A platform may be arranged within the foundation structure, for example within the monopile or the transition piece. A J-tube may be guided at the foundation structure to the platform. In this regard, the J-tube may be guided inside or outside the foundation structure. A J-tube may also be guided on a non-hollow foundation structure. The platform is preferably arranged inside the foundation structure. Radially circumferentially, an inspection platform and/or a landing platform may further be arranged at the foundation structure.

The shading element is provided in addition to these outer, radially circumferential platforms. In contrast to the radially circumferential platforms, the shading element is thereby arranged only along at least one partial circular arc on the hollow structural element.

According to an embodiment, it is proposed that the shading element is arc-shaped. Here, the shading element may have a curvature. The curvature of the shading element may thereby be geometrically similar to the curvature of the hollow structural element. In this regard, it is particularly proposed that the shading element has at least one circular arc. The circular arc may have the same center as a hollow structural element and this center may be located in particular centrally in a hollow structural element.

It is also possible for the shading element to be straight. In cross-section, the shading element may be straight.

Furthermore, it is possible that the shading element is formed from at least two straight sections extending running at an angle to one another. The angle between the two sections may embrace the hollow structural element.

According to one embodiment, it is proposed that the shading element is arranged along an arc section around the hollow structural element. The arc section is smaller than 360°. In particular, the arc section is only a partial circular arc. In particular, the arc section has an arc angle of at least 45°, preferably at least 120°, in particular at least 240°. In particular, the arc section spans an angle between 90° and 150°, in particular a range between 110° and 130°. Said arc angles may be sufficient to cause shading of the cable arrangement during periods of maximum solar radiation.

According to an embodiment, it is proposed that the shading element is arranged at an outer lateral surface of the hollow structural element. In this regard, connecting webs may be arranged in material bond at the hollow structural element and at the shading element.

As already explained, the hollow structural element may be one-piece or multi-piece and may be formed as a monopile or as a transition piece. Also, the hollow structural element may include both the monopile and the transition piece. The hollow structural element may also be formed as a J-tube.

According to an embodiment, it is proposed that the shading element is arranged at the monopile or at the transition piece. According to an embodiment, it is proposed that the shading element is arranged at the J-tube.

It is also proposed that the shading element protrudes over the transition piece in a collar-shaped fashion. A circumferential platform, in particular a landing platform, may be arranged on the transition piece at the outer lateral surface. On such a platform, the shading element may additionally be arranged pointing radially outward in a collar shape. The shading element may be arranged at the height of the platform (airtight deck).

The shading element may extend horizontally in a radial direction away from the hollow structural member. In addition, the shading element may be inclined in the axial direction. The shading element may be inclined downwardly, in particular in the direction of the hollow structural element.

The best effect is achieved by the shading element when it causes shading of the cable arrangement at times of maximum solar radiation. For this reason, it is proposed that the shading element is arranged on the south side of the installed hollow structural element. This applies to installations in the northern hemisphere. For installations in the southern hemisphere, the shading element is preferably arranged on the north side of the hollow structural element.

The shading element is perforated, in particular slotted or round perforated, for improved cooling. The slots are preferably rectangular. Their longitudinal axes preferably run perpendicular to the longitudinal axis of the hollow structural element. This prevents solar radiation on the cable arrangement through the slits. The slots preferably have a width that is smaller than twice the wall thickness of the shading element.

To allow sufficient air circulation between the shading element and the hollow structural element and/or the cable arrangement, it is proposed that there is a clear width between the hollow structural element and/or the cable arrangement and the shading element. According to one embodiment, this clear width is varied along the arc section. In particular, the clear width in a central region of the arc section is smaller than the clear width at at least one outer edge of the arc section. Through this, a nozzle effect is achieved between the hollow structural element and the shading element, whereby the through-flowing air is accelerated and thus has a better cooling function.

According to an embodiment, it is proposed that the shading element is, along the arc section, at least partially convexly shaped on the side facing the hollow structural element. This shape leads to an increased flow velocity between the hollow structural element and the shading element. To achieve an airfoil effect, it is proposed that the shading element is convexly shaped in the region of at least one outer edge of the arc section on the side facing the hollow structural element.

A platform, in particular a landing platform, may be arranged at the hollow structural element on the outside. This loading platform may already provide shading to the hollow structural element. In addition to this, the shading element may be provided. To save material, the effect of the already existing shading may be used by arranging the shading element on the hollow structural element in such a way that, in the assembled state of the hollow structural element, the shading element is arranged on the hollow structural element at a distance in the longitudinal direction from the platform. This distance may be chosen in particular depending on the latitude of an assembly position of the wind energy plant. The higher the sun is in the zenith, the longer a shadow of a platform may be. The distance in the longitudinal direction of the hollow structural element between the shading element and the platform may then be larger.

According to one embodiment, it is proposed that the cable arrangement is guided between the foundation structure and the shading element.

The shading element is in particular a metal sheet, preferably a steel sheet.

The shading element is attached to the hollow structural element with spacers, so that air circulation is possible between the hollow structural element and the shading element.

In particular, the hollow structural element is tubular.

Another aspect is a wind energy plant according to claim 17. A wind energy plant may be a wind force plant, a sub-station, a converter platform (HVDC platform), a transformer station, or the like. In particular, the wind energy plant is an offshore plant.

BRIEF DESCRIPTION OF THE DRAWINGS

In the following, the subject matter is explained in more detail with reference to a drawing showing exemplary embodiments. In the drawing show:

FIGS. 3a-d various arrangements of shading elements;

DETAILED DESCRIPTION OF THE INVENTION

Figure 1A:
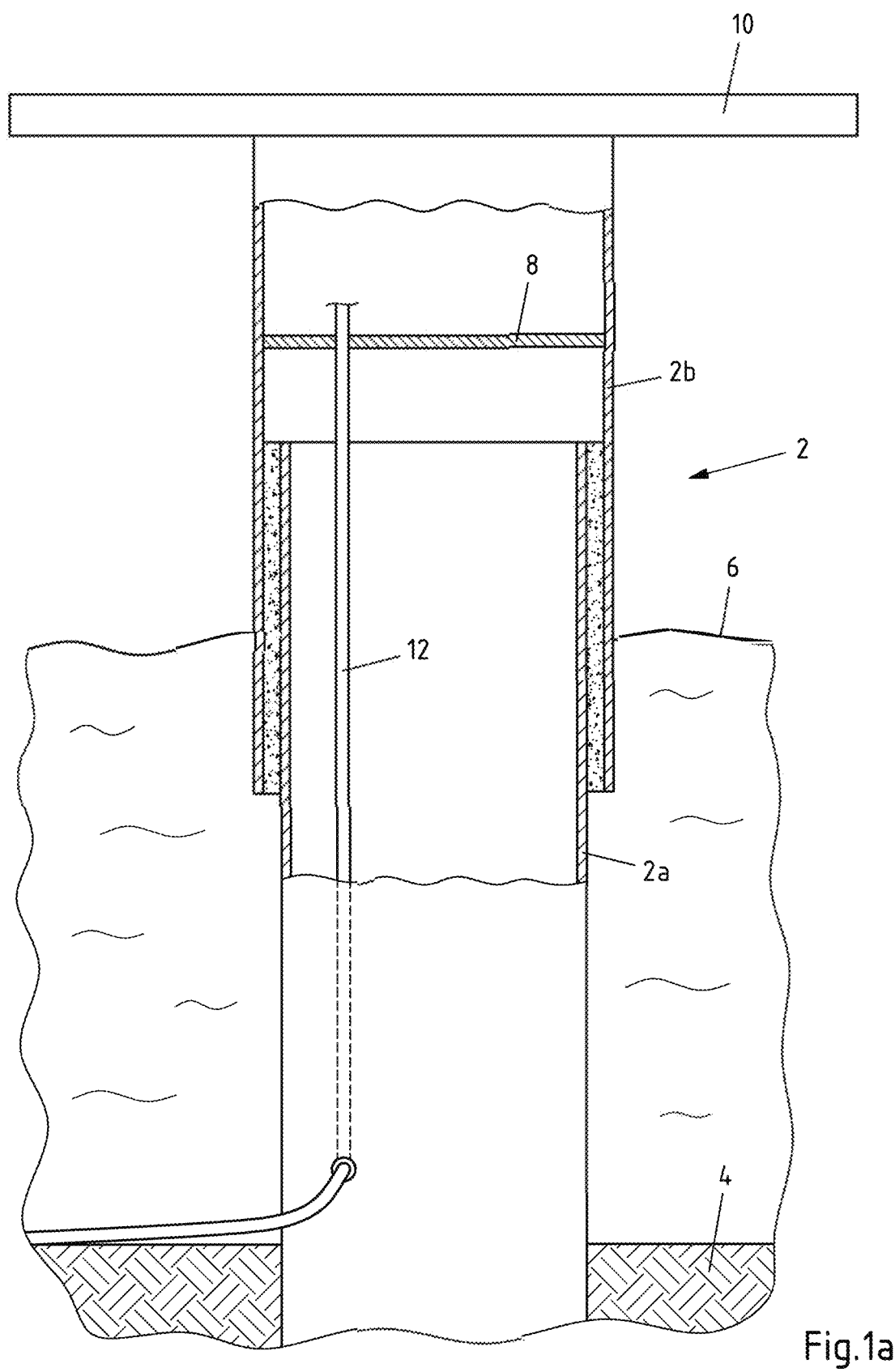
FIG. 1a, b hollow structural elements with cable arrangements.

FIG. 1 shows a hollow structural element 2 of a wind energy plant. The hollow structural element 2 is formed from a monopile 2a and a transition piece 2b as a foundation structure.

The monopile 2a is founded on the seabed 4 and protrudes from the water surface 6.

The monopile 2a is rammed into the seabed 4. The dimension of the monopile 2a may change thereby. In order to obtain defined connection points for a tower of the wind energy plant, the transition piece 2b is placed onto the monopile 2a. The transition piece 2b may have an airtight deck 8 in its interior. The airtight deck 8 may be understood as a platform. Also, a circumferential, externally arranged platform 10 may be arranged on the transition piece 2b. The platform 10 may be formed as a landing platform. This construction of a hollow structural element 2 is sufficiently known.

A cable arrangement 12 may be formed of one or more cables, each having an insulator and a cable core formed of an electrical conductor. The cables may be guided in the cable arrangement 12 in a common sheath, in particular a common insulation.

In FIG. 1a, it is shown that the cable arrangement 12 is guided below the water surface 6 into the interior of the hollow structural element 2 and is guided inside the hollow structural element 2 up to the airtight deck 8. Originating from the airtight deck 8, an electrical contacting of the cables of the cable arrangement 12 is realized a manner in itself known with power electronics known by themselves.

Via the cables of the cable arrangement 12, the electrical energy generated by the wind energy plant 2 is transported to a power supply network. In the process, considerable electrical power flows through the cables of the cable arrangement 12. The resulting high currents cause joule losses, which are proportional to the ohmic resistance of the respective conductors. To reduce the ohmic resistance, the conductor cross sections are selected to be large.

The resulting ohmic losses would have to be dissipated to the environment via convection to prevent the cable arrangement 12 from heating up so strongly as to cause damage.

However, between the water surface 6 and the airtight deck 8, air exchange within the hollow structural element 2 is severely restricted, if not eliminated. As a result, the interior of the hollow structural element 2 heats up and the ohmic losses within the cables of the cable arrangement 12 can no longer be dissipated well.

If, at times of strong wind, large electrical powers are transported via the cable arrangement 12, the cables of the cable arrangement 12 heat up particularly strongly. If there is then also strong solar radiation on the hollow structural element 2, the interior of the hollow structural element 2 between the water surface 6 and the airtight deck 8 heats up considerably. Such extreme conditions, too, must be taken into account when dimensioning the conductor cross-sections of the cables of the cable arrangement 12.

In order to be able to dimension the conductor cross sections smaller, it is proposed to shade the hollow structural element 2, as will be shown below.

Figure 1B:
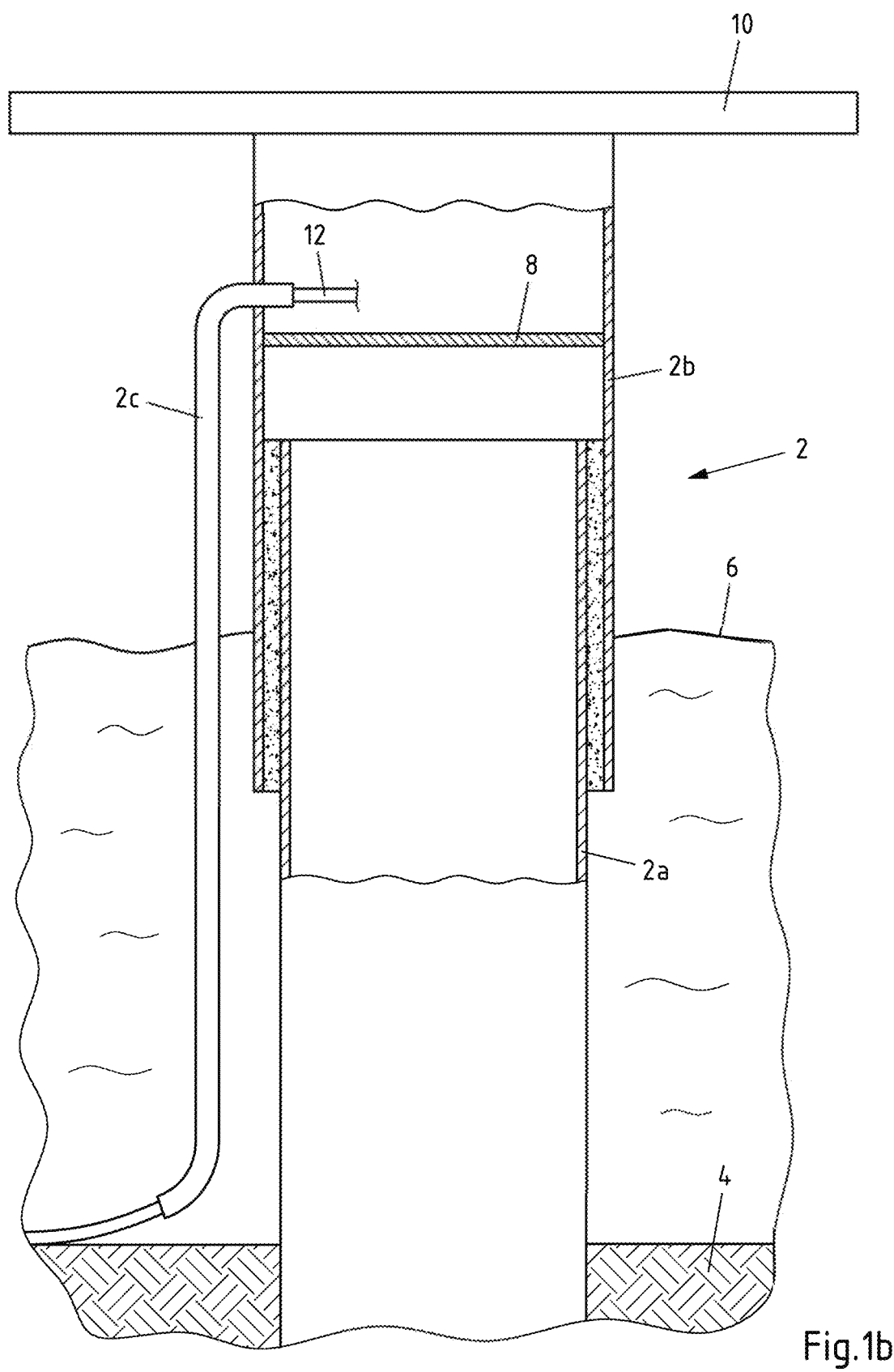

FIG. 1b shows a hollow structural element 2c, which is formed as a J-tube. In contrast to FIG. 1a, in FIG. 1b the cable arrangement 12 is guided in the J-tube outside the foundation structure. The J-tube also completely encloses the cable arrangement 12, so that, similar to what was described previously, considerable heat generation inside the J-tube can result. If there is direct sunlight onto the J-Tubes, significant temperatures arise within the cables of the cable arrangement 12. Here as well, a shading is also proposed as described below. The hollow structural element 2c may also be guided (not shown) within the monopile 2a and/or within the transition piece 2b.

Figure 2A:
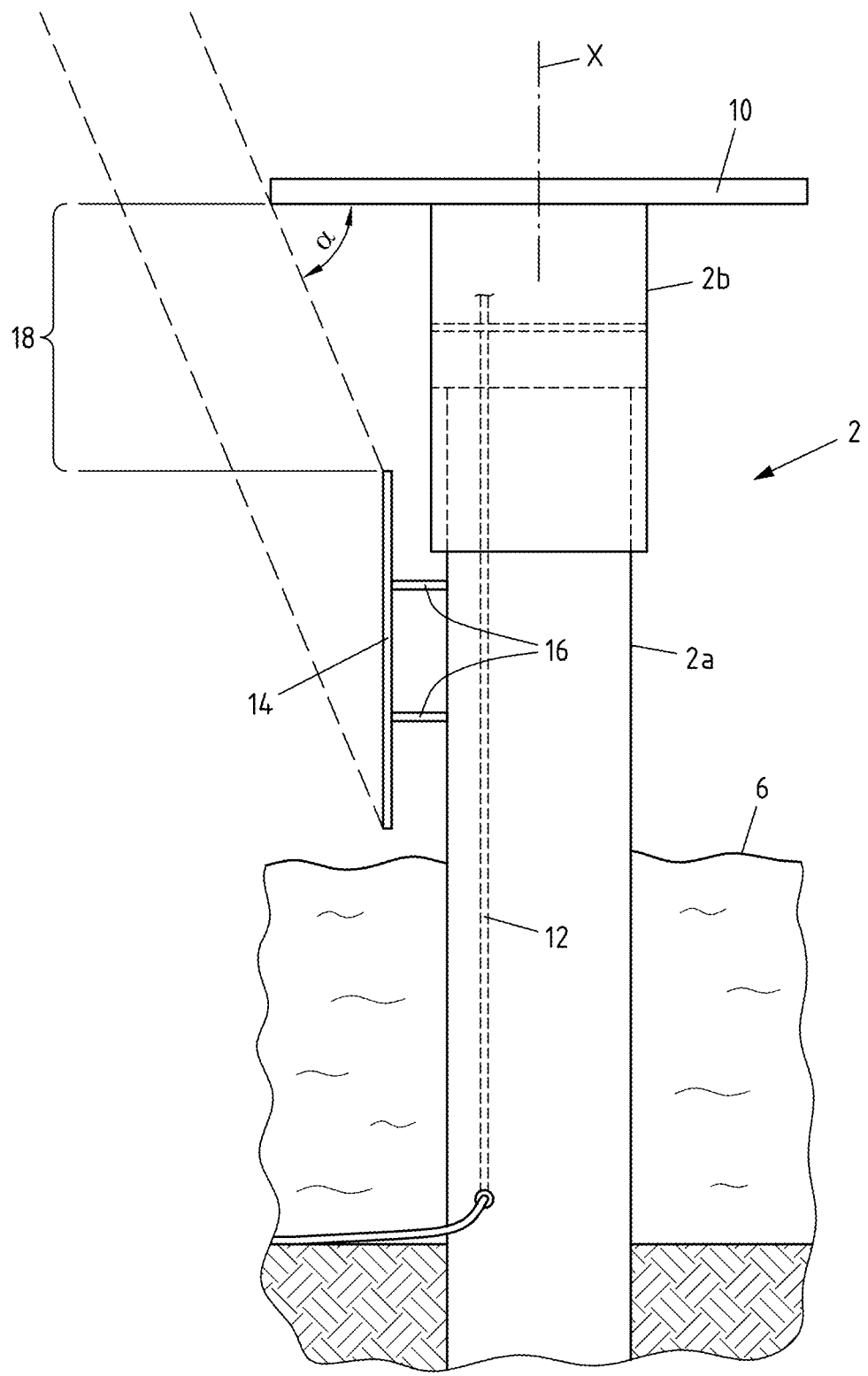
FIG. 2a a hollow structural element with a shading element according to an embodiment.

FIG. 2a shows a hollow structural element 2 corresponding to FIG. 1a. The cable arrangement 12 is shown in FIG. 2a according to FIGS. 1a and 1n FIG. 2b according to FIG. 1b.

Figure 2B:
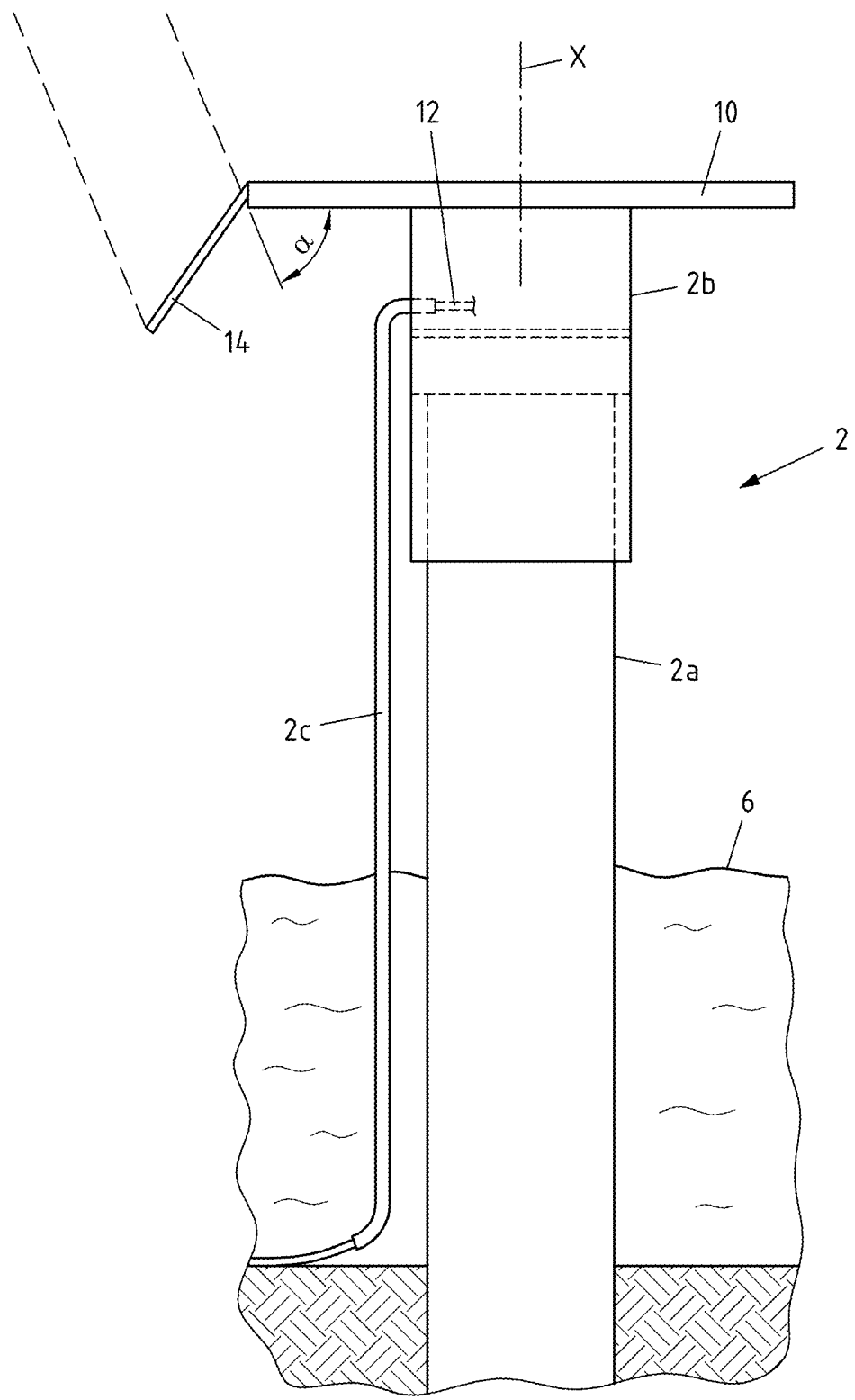
FIG. 2b a hollow structural element with a shading element according to an embodiment.

To avoid solar radiation, especially when the sun is near its zenith, a shading element 14 is proposed. The shading element 14 may be attached to the hollow structural element 2 by spacers 16. The cable arrangement 12 may be guided within the hollow structural element 2. The cable arrangement 12 may also, as shown in FIG. 2b, be arranged on the outside of the foundation structure 2a,b on the J-tube formed as the hollow structural element 2 c. In this case, the cable arrangement 12 may be arranged with a clear width between the shading element 14 and the outer lateral surface of the foundation structure.

If the sun is close to its zenith, it radiates at an angle α onto the hollow structural element 2. Due to the outwardly projecting platform 10, an area between the platform 10 and the upper edge of the shading element 14 is already shaded. At this distance along the longitudinal axis X of the hollow structural element 2, the shading element 14 may be spaced apart from that of the platform 10. The shading element 14 causes the interior of the hollow structural element 2 to heat up less, so that the conductor cross-sections of the cables of the cable arrangement 12 can be reduced compared to conventional arrangements.

FIG. 2b shows another possibility of arranging the shading element 14 directly on the platform 10. The shading element 14 may face radially outwardly away from the platform 10. It is also possible for the shading element 14 to be angled downward. The length of the projection, as well as the angle of inclination, may be selected such that the shading element 14 causes shading of the entire hollow structural element 2 substantially down to the water surface 6. The cable arrangement 12 is shaded by the shading element 14. The cable arrangement 12 may also be arranged in the hollow structural element 2 as shown in FIG. 2a.

Figure 2C:
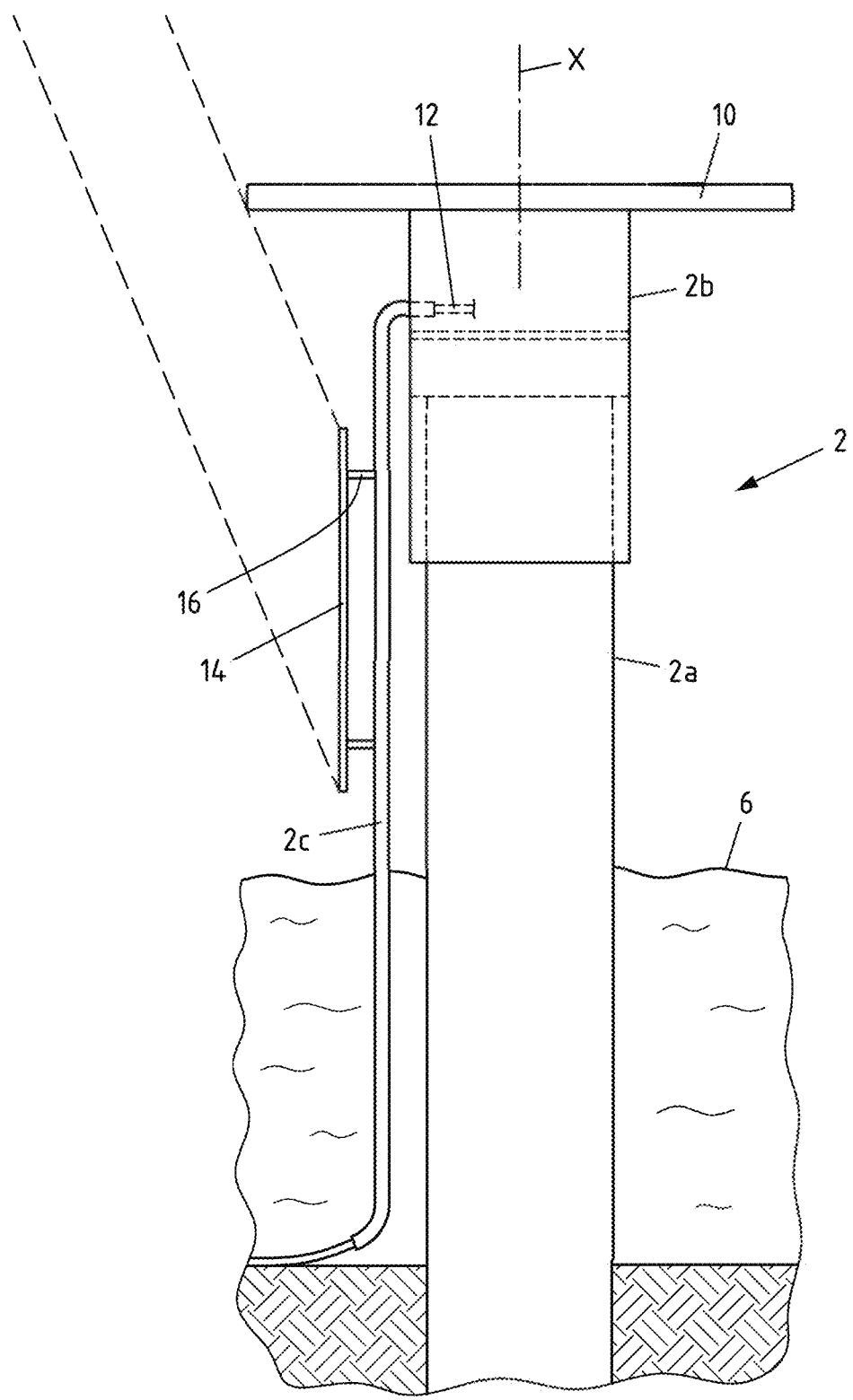
FIG. 2c a hollow structural element with a shading element according to an embodiment.

FIG. 2c shows an arrangement of a hollow structural element 2c as a J-tube at the outside of the monopile 2a and/or the transition piece 2b. On the J-tube, the shading element 14 is arranged directly by webs 16. The shading of the cable arrangement 12 happens as described in FIGS. 2a, b. The elements of FIGS. 2a-c may be freely combined with each other. The foundation structure according to FIG. 2c may also be a non-hollow element, e.g. a foundation. The structures according to FIGS. 2a-c are in particular offshore structures.

In the following, the hollow structural element 2 is described as representative of the J-tube 2c or the monopile 2a and/or of the transition piece 2b.

FIGS. 3a-d show a section through the hollow structural element 2 and the shading element 14 transverse to the longitudinal axis X, in particular perpendicular thereto.

In FIG. 3a, it may be seen that the hollow structural element 2 is tubular. Spaced apart from the hollow structural element 2, the shading element 14 is stretched in an arc segment with an arc angle β. The radius to a center point 2c of the shading element 14 is larger than the radius of the hollow structural element 2.

The shading element 14 is attached to the hollow structural element 2 via spacers 16 in a distanced fashion.

In particular, the shading element 14 is oriented toward the south in the northern celestial sphere, whereas it is oriented toward the north in the southern celestial sphere. The shading element 14 shown in FIG. 3a is arc-shaped.

FIG. 3b shows another shading element 14 which is shaped straight, wherein the shading element 14 also spans an arc angle 3.

In FIG. 3c, a shading element 14 is formed of two straight structural elements, oriented at an angle γ to each other. The legs of the shading element 14 partially embrace the hollow structural element 2.

FIG. 3d shows an embodiment in which the shading element 14 is arranged completely circumferentially around the hollow structural element 2.

Figure 4A:
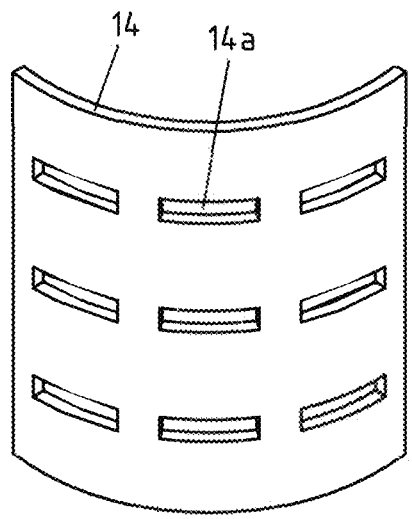
FIG. 4a, b views of shading elements.
Figure 4B:
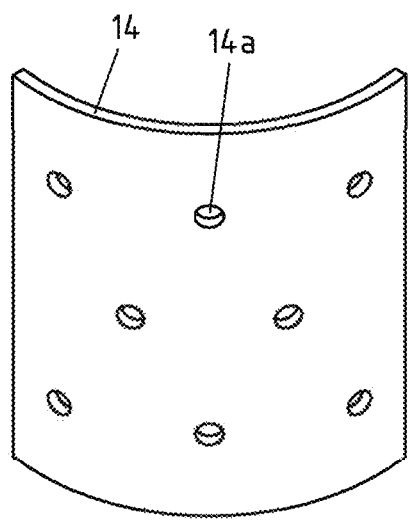

As already explained, the shading element 14 may be formed of a metal sheet and may be perforated. FIG. 4a shows a shading element 14 with slots 14a. FIG. 4b shows a shading element with holes 14b. The slots 14a and/or the holes 14b provide a good ventilation in the space between the hollow structural element 2 and the shading element 14.

Figure 5A:
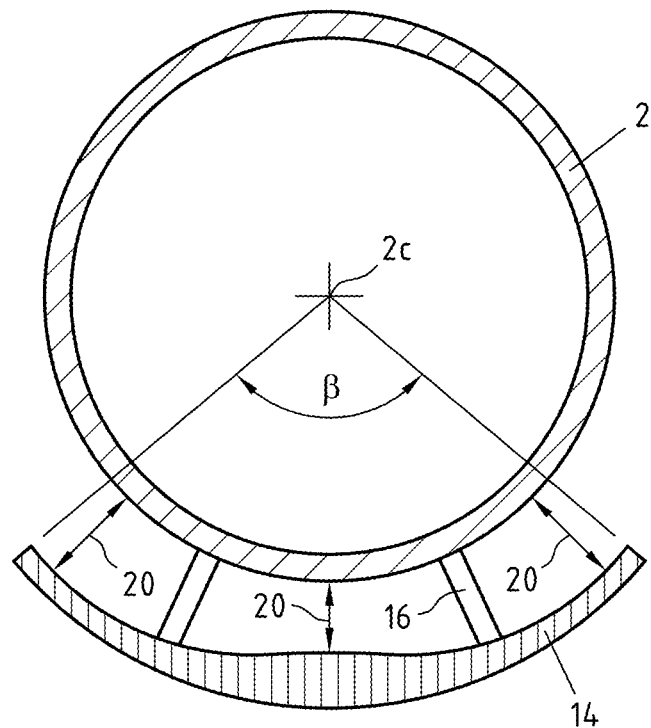
FIG. 5a, b shading element with different flow contours.

The shading element 14 may be formed in a profiled manner, in particular profiled such that a distance between the shading element 14 and the hollow structural element 2 varies along the arc angle 3. A possible embodiment is shown in FIG. 5a. Here, the surface of the shading element 15 facing the hollow structural element 2 is convexly shaped so that a distance 20 between the hollow structural element 2 and the shading element 14 varies. Shown is that the distance 20 is smaller in a center region than in an edge region.

Figure 5B:
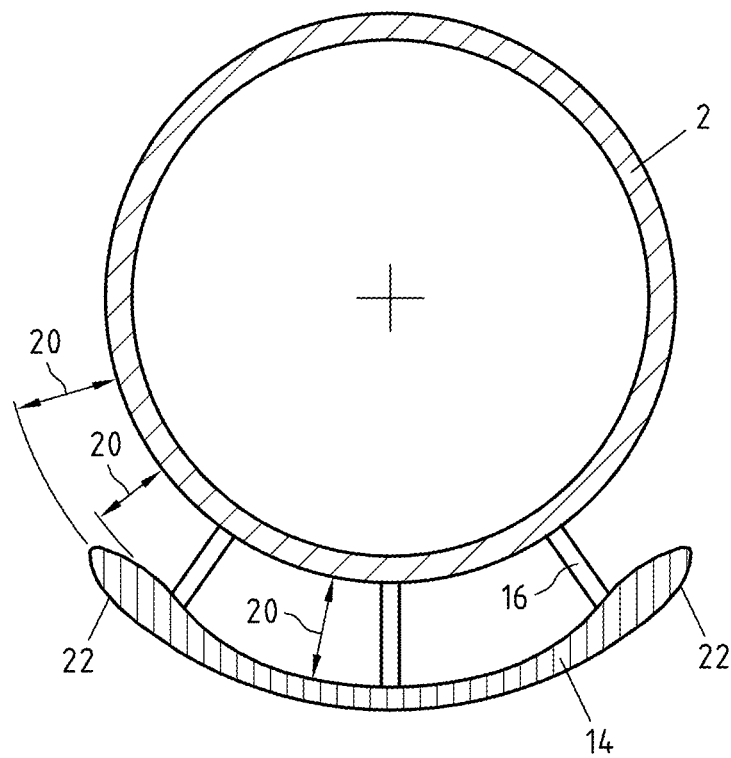

FIG. 5b shows a shading element 14 which is formed in the manner of a wing in its edge regions 22. It can be seen that in the edge region 22, the distance 20 between the shading element 14 and the hollow structural element 2 varies, wherein a greater distance is initially given, it becomes smaller due to the convex shape and becomes greater again towards the central region of the shading element 14.

Due to the two profilings as shown in FIGS. 5a and b, the cooling effect of the circulating air between the hollow structural element 2 and the shading element 14 is increased, since the flow velocities of passing air are increased.

REFERENCE LIST

2 Hollow structural element
2a Monopile
2b Transition Piece
2c J-Tube
2c Center point
4 Seabed
6 Water surface
8 Airtight deck
10 Platform
12 Cable arrangement
14 Shading element
14a Slot
14b Hole
16 Spacer
18 Area
20 Space
22 Edge area All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Hollow structural element of a wind energy plant comprising:
a hollow structural element, and
a cable arrangement extending along the hollow structural element,
wherein
a shading element is arranged at the hollow structural element at a distance from the cable arrangement,
a clear width between the hollow structural element and the shading element varies along an arc section, and
the clear width in a central region of the arc section is smaller than the clear width at at least one outer edge of the arc section.

2. Hollow structural element according to claim 1, wherein
the shading element is arc-shaped, wherein the shading element has a curvature or
the shading element has at least one circular arc or
the shading element is straight or
the shading element is formed from at least two straight sections running at an angle to one another, wherein the angle between the straight sections encompasses the hollow structural element.

3. Hollow structural element according to claim 1, wherein
the shading element is arranged along an arc section around the hollow structural element, wherein the arc section spans at least one of
an arc angle of at least 45°,
an arc angle of at least 120°,
an arc angle of at least 240°,
an arc angle between 90° and 150° or
an arc angle between 110° and 130°.

4. Hollow structural element according to claim 1, wherein
the shading element is arranged at an outer lateral surface of the hollow structural element and/or
the shading element is fastened to the hollow structural element with spacers.

5. Hollow structural element of a wind energy plant comprising:
a hollow structural element, and
a cable arrangement extending along the hollow structural element,
wherein
a shading element is arranged at the hollow structural element at a distance from the cable arrangement,
wherein
the hollow structural element comprises a monopile or a transition piece or is a J-tube.

6. Hollow structural element according to claim 5, wherein
the shading element is arranged at the monopile or at the transition piece.

7. Hollow structural element according to claim 1, wherein
the shading element projects beyond the hollow structural element in a collar-shape,
the shading element projects beyond the hollow structural element radially outwardly, in the region of a platform, and/or
the shading element is inclined in the direction of the hollow structural element.

8. Hollow structural element according to claim 1, wherein
the shading element is arranged on the south side of the hollow structural element in the installed state, and/or
the shading element is perforated and/or
the shading element is slotted and/or
the shading element is round perforated.

9. Hollow structural element of a wind energy plant comprising:
a hollow structural element, and
a cable arrangement extending along the hollow structural element,
wherein
a shading element is arranged at the hollow structural element at a distance from the cable arrangement,
wherein
the shading element is at least in parts convexly shaped along the arc section on the side facing the hollow structural element and/or
the shading element is convexly shaped in the region of at least one outer edge of the arc section on the side facing the hollow structural element.

10. Hollow structural element according to claim 1, wherein
the shading element is arranged on the hollow structural element in such a way that, in the installed state of the hollow structural element, the shading element is arranged on the hollow structural element at a distance in the longitudinal direction from a platform and/or
the shading element is arranged on the hollow structural element at a distance in the longitudinal direction from a platform wherein the distance is chosen as a function of a latitude of an assembly position of the hollow structural element.

11. Hollow structural element according to claim 1, wherein
the cable arrangement is guided within the hollow structural element and/or between the hollow structural element and the shading element.

12. Hollow structural element according to claim 1, wherein
the shading element is formed from a metal sheet.

13. Hollow structural element according to claim 1, wherein
the hollow structural element is tubular.

14. Wind energy plant, wherein the wind energy plant is an offshore wind energy plant comprising a hollow structural element according to claim 1.

* * * * *